Feb. 25, 1969  H. C. RICE  3,429,613
SAFETY SEAT BELT ANCHORAGE
Filed May 19, 1967  Sheet 1 of 2

INVENTOR
HERBERT C. RICE
BY Barnard, McGlynn & Reising
ATTORNEYS

INVENTOR
HERBERT C. RICE
BY Barnard, McGlynn & Reising
ATTORNEYS

United States Patent Office 3,429,613
Patented Feb. 25, 1969

3,429,613
SAFETY SEAT BELT ANCHORAGE
Herbert C. Rice, 16940 Log Cabin,
Detroit, Mich. 48203
Filed May 19, 1967, Ser. No. 639,709
U.S. Cl. 297—386     7 Claims
Int. Cl. B60r 21/10

ABSTRACT OF THE DISCLOSURE

The subject matter of this invention is a mechanical energy dissipating anchoring system for automotive seat belts. In its preferred embodiment, the anchoring system consists of a round bar which is plcaed in a hollow truncated V-shaped guide chute. During normal operation the bar fits snugly inside the chute at its rear end and the seat belt is anchored to the bar. During a collision resulting in a severe deacceleration the inertial energy of the restrained passenger acting through the seat belt drives the bar to the forward end of the chute wherein the impact force to which the restrained passenger is subjected is lowered and the movement of the bar through the chute frictionally dissipates a substantial amount of the passenger's energy. In addition, the bar may be so positioned that its travel crushes the rear portion of the seat support brackets thereby lowering the rear portion of the seat with respect to its front portion to further restrain the passenger during a collision.

---

Conventionally, automotive seat belts are rigidly anchored to the floor of the car. Therefore, during a collision, a large restraining force is applied to the abdomen of the restrained passenger while his chest and head portions remain relatively unrestrained. Frequently, this results in serious injuries to the internal organs in the abdominal area as well as serious injuries from jackknifing. Therefore, passenger safety would be significantly enhanced if the impact forces applied to the abdomen could be reduced and if a method were found to mechanically dissipate substantial quantities of the passenger's inertial energy. Therefore, there is considerable need for an inexpensive mechanical device which would reduce and spread out the impact forces on the abdomen of a restrained passenger while dissipating a substantial portion of his inertial energy. The present invention fulfills this need.

Briefly, the invention embodies a two element mechanical anchorage structure. In its preferred embodiment, there is employed a round bar secured inside at the rear end of at least one hollow chute having top and bottom guide plates forming a truncated V. Each chute may be securely anchored to the floor of an automobile with the seat belt anchored to the bar. During a crash, the restrained passenger's inertial force acting through the seat belt drives the bar forwardly through the chute to the forward end of the chute, the checking point, while the bar is in constant frictional engagement with the guide plates. The frictional engagement between the bar and the chute dissipates a substantial amount of the inertial energy of the restrained passenger wherein the impact forces placed on his abdomen are substantially reduced and his inertial energy is substantially dissipated by the wedge action of the chute on the driven bar. Further, the bar may so positioned that during travel it crushes the rear portion of the seat brackets thereby lowering the rear portion of the seat with respect to its front portion to further restrain the restrained passenger during a collision.

Figure 1:
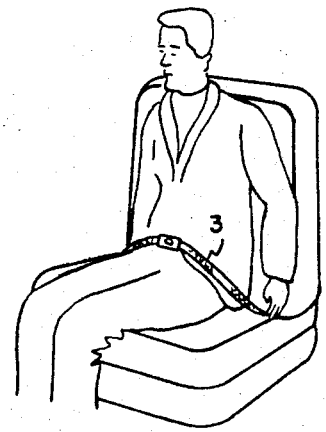
Figure 2:
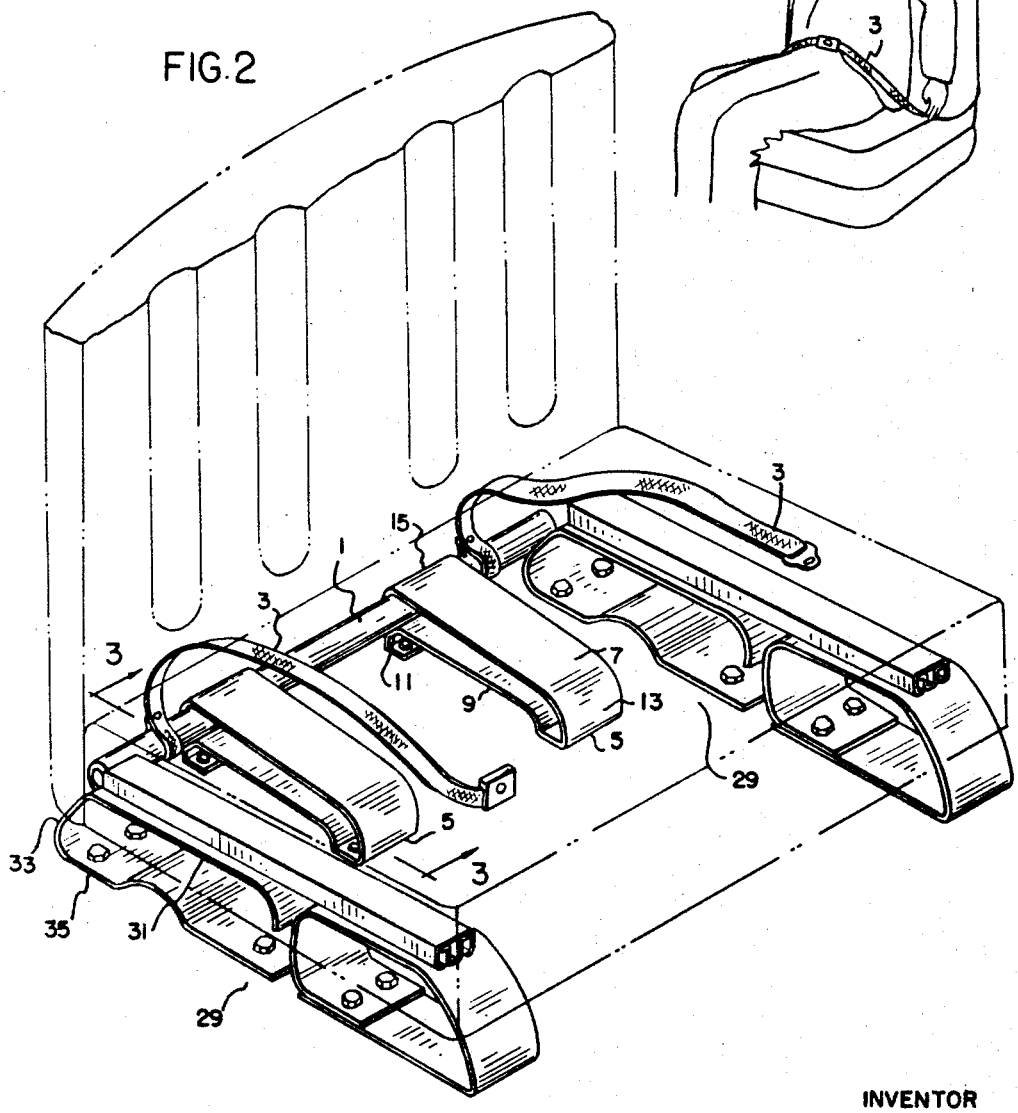
Figure 3:
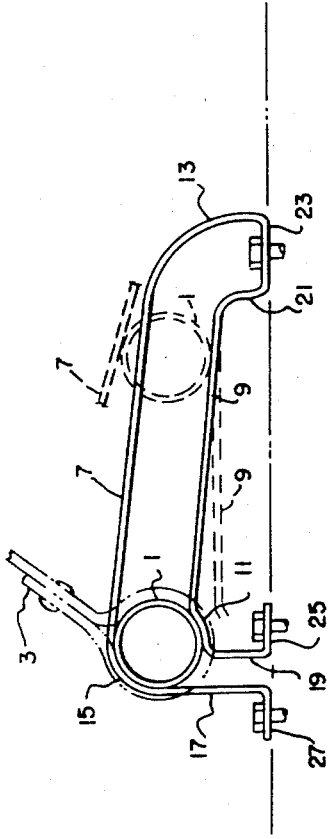
Figure 4:
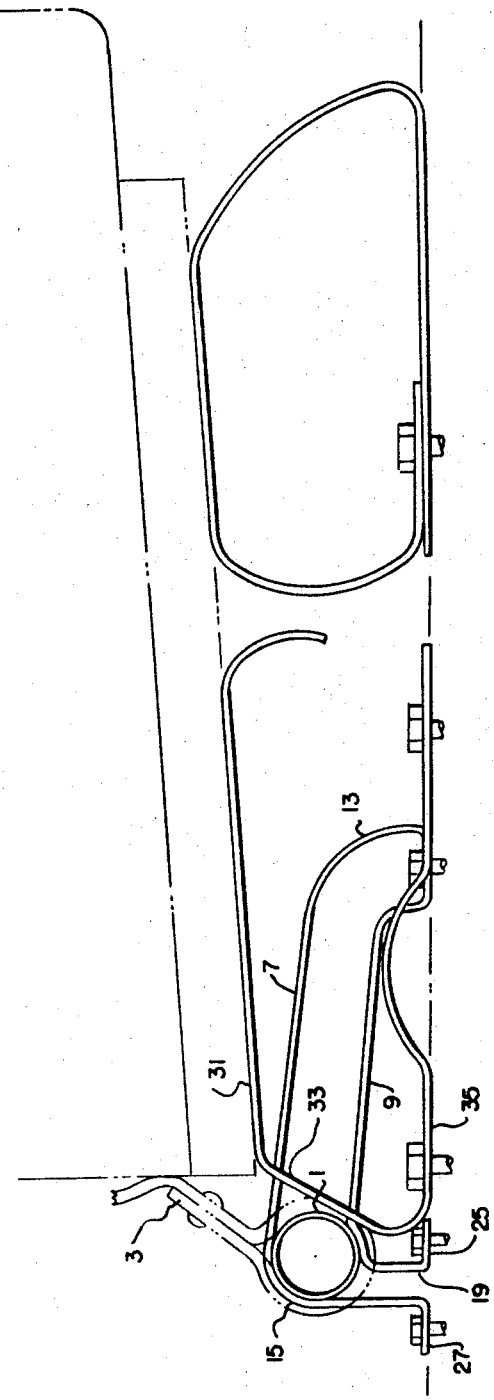

The invention may be better understood by reference to the drawings and the detailed description which follows:

FIGURE 1 is a perspective view of a restrained passenger in a bucket seat;
FIGURE 2 is a perspective view of the seat brackets for supporting the bucket seat of FIGURE 1 and the anchorage structure for the seat belt of FIGURE 1;
FIGURE 3 is a cross-section through line 3—3 of FIGURE 2; and
FIGURE 4 is a side view of the structure of FIGURE 2.

With reference to the drawings there is shown therein the preferred embodiment of the seat belt anchorage system and in addition seat brackets whose rear portions are adapted to be crushed by the operation of the anchorage system are shown. Although the drawings show the anchorage and seat system for a bucket seat, the invention may readily be employed with ordinary three-passenger seats. As shown in FIGURES 2–4, round bar 1 has both straps of seat belt 3 fastened to it, and is positioned rearward inside a pair of hollow guide chutes 5. Although, only one chute 5 is necessary for the practice of the invention, the use of two chutes is preferred. Each chute 5 has a top guide plate 7 and a bottom guide plate 9. Contiguous with plate 9 is a rounded portion 11 which, in combination with rounded back portion 15 which is contiguous with plate 7, is adapted for maintaining bar 1 in its rest position. Rounded nose 13 is contiguous with plate 7 and acts to check the forward motion of bar 1 thereby forming a checking point.

Vertical plate 17 is contiguous with rounded portion 15 and has a flange 27 which is adapted to be bolted to the floor (not shown). Vertical portion 19 contiguous with rounded portion 11 also has a flange 25 which is adapted to be bolted to the floor. At the other end of chute 5 is rounded portion 21 which is contiguous with plate 9 and is connected to nose 13 by plate 23 which is also adapted to be bolted to the floor. Plates 7 and 9 are preferably askew with respect to each other so as to form a truncated V so that when bar 1 moves down chute 5, it is subject to wedge action thereby increasing the frictional resistance of chutes 5 to the movement of bar 1.

Owing to the fact that the forward movement of a restrained passenger during a crash will create an upward as well as a forward component of force and since as shown plate 9 is slanted downward with respect to the floor, flange 25, vertical section 19, rounded portion 11, plate 9 and rounded portion 21 may be eliminated from each of chutes 5, if bar 1 is lightly welded to chutes 5 preferably at rounded portion 15. The upward force will maintain the frictional contact of bar 1 with plates 9 as bar 1 after breaking the weld is driven toward nose 13. However, the frictional resistance offered to bar 1 will be considerably less than that obtained by use of the preferred chute structure as previously described. However, it is somewhat less expensive to manufacture and may be employed if economy so dictates.

In operation, when a restrained passenger is using seat belt 3 during a crash, the inertial force of the passenger is transmitted through belt 3 to bar 1 pulling bar 1 down chute 5 until bar 1 reaches nose 13. In the preferred embodiment, owing to the fact that plates 7 and 9 form a truncated V, this frictional resistance increases with increased travel through wedge action until bar 1 reaches nose 13. The heat dissipated through friction is derived from the inertial energy of the occupant and owing to the travel of bar 1, the impact force applied to the restrained passenger through seat belt 3 is spread out and substantially reduced. The net result is that the passenger deaccelerates much more slowly than the car itself. If flange 25, vertical section 19, rounded portion 11, plate 9, and rounded portion 21 are eliminated from chute 5, the bar will slide down to nose 13 while constantly in frictional engagement with guide plate 7, but the inertial energy dissipated by friction will be considerably less than that dissipated when the wedge action of guide plates 7 and 9 on bar 1 is employed.

As shown, the anchorage structure is adapted for a bucket seat. However, when used for a conventional seat, one bar may be used to which all seat belts are attached with each outside seat position fitted with a pair of chutes. Although a pair of chutes may also be provided for the middle seat, they are not required.

Further, the above anchorage structures may be used to assist in lowering the rear of the seat with respect to its front portion when employed in combination with a seat bracket structure such as 29, whose rear portion is designed so that it will be lowered or crushed by the action of bar 1. One such structure is shown in FIGURES 2 and 4 having a bottom plate 35, a top plate 31, and a rearward connecting plate 33 having a forward slope. During a collision, bar 21 would be positioned so that it would strike connecting portion 33 thereby decreasing its angle with respect to the floor. This action would lower the rear portion of the seat with respect to the forward portion to provide further safety protection for the restrained passenger. The advantages to the passenger resulting from this seat action are fully described in my copending application, Ser. No. 590,715.

The embodiments of the invention in which an exclusive property or privilege is claimed are defined as follows:

1. An energy absorbing device adapted for anchoring a seat belt comprising a first member and a second member including a top guide plate and a nose, said first member being positioned in a first position with respect to said second member, said second member being adapted to continuously frictionally engage said first member when said first member is driven from said first position to a second position defined by said nose.

2. The anchorage system of claim 1 wherein said first member is a bar and said second member is a chute including, in addition to said top guide plate and nose, a bottom guide plate, said bottom plate being positioned so as to continuously frictionally engage said bar as it is driven from said first to said second position.

3. The anchorage system of claim 2 wherein said top plate and bottom plate are askew wherein said chute forms a truncated V.

4. A passenger restraining system comprising at least one chute member having a top guide plate and a nose, a bar member adapted to engage said chute member in a first and a second position, said chute member being adapted to frictionally engage said bar as said bar is driven from said first to said second position, and a seat belt attached to one of said members to drive one of said members during severe deacceleration by the inertial energy of a passenger restrained by said seat belt from said first to said second position.

5. The restraining system of claim 4 wherein said chute member includes a bottom guide plate and wherein said chute is in the form of a truncated V, said bar being positioned for frictionally engaging both of said plates as said bar travels from said first to said second position.

6. The passenger restraining system of claim 4 additionally including seat brackets having rear portions adapted for being lowered as said bar moves from said first to said second position, thereby lowering the rear portion of said brackets with respect to their front portions.

7. The restraining system of claim 5 wherein said chute member is adapted to be rigidly secured to an automotive floor, and wherein said seat belt is anchored to said bar.

References Cited

UNITED STATES PATENTS

| | | | |
|---|---|---|---|
| 2,227,717 | 1/1941 | Jones | 297—386 X |
| 3,059,966 | 10/1962 | Spielman | 297—216 |
| 3,089,564 | 5/1962 | Smittle | 297—386 |
| 3,186,760 | 6/1965 | Lohr et al. | 297—216 |
| 3,308,908 | 3/1967 | Bunn | 297—386 |
| 3,361,475 | 1/1968 | Villiers | 297—386 |

JAMES T. McCALL, Primary Examiner.

U.S. Cl. X.R.

248—399; 297—216, 385